Aug. 21, 1945.   W. R. SCHMITZ, JR   2,383,085
MATERIAL FEEDING APPARATUS
Filed April 29, 1943   4 Sheets-Sheet 4

William Richard Schmitz, Jr. INVENTOR.

BY A. Ralph Snyder
ATTORNEY

Patented Aug. 21, 1945

2,383,085

UNITED STATES PATENT OFFICE 2,383,085

MATERIAL FEEDING APPARATUS

William Richard Schmitz, Jr., Wilmington, Del., assignor to E. I. du Pont de Nemours & Company, Wilmington, Del., a corporation of Delaware Application April 29, 1943, Serial No. 484,957

6 Claims. (Cl. 271—39)

This invention relates to apparatus for controlled feeding of materials to a receiving means. More particularly, it relates to apparatus for feeding sheets of cellulose at a constant rate to a reaction vessel, which apparatus is especially adapted for use in the continuous production of alkali cellulose.

For the successful operation of a continuous process, it is necessary, among other things, to feed the raw materials at a constant and uniform rate into the reaction chamber or other receiving apparatus employed. Of the several methods proposed to accomplish this uniform feed, the "loss of weight" principle has generally proven the most successful. According to this principle, an amount of raw material sufficient for an extended period of operation is placed on a feeding means supported on a scale mechanism, the scale being brought by hand to a position of balance at the start of the operation. The balancing poise of the scale is then advanced along the scale beam toward the fulcrum of the scale in a continuous manner and at a uniform rate, equal to the desired rate of addition of raw material. The unbalanced condition of the scale brought about by this movement of the poise actuates the feeding mechanism to deliver the raw material into the reaction chamber or other receiving means involved in the manufacturing process. This feeding mechanism is generally so arranged as to deliver the raw material into this means at a speed somewhat greater than that called for by the movement of the poise. Thus, after a short period of operation, the scale is again in a condition of balance and the action of the feeding mechanism is stopped. The continuing, uniform advance of the poise, however, soon creates a new condition of unbalance that again places the feeding mechanism in operation. Although the raw material is fed into the reaction chamber or receiving means in an intermittent rather than continuous fashion, the intervals during which the feeding mechanism is at rest are so short that the feeding is substantially continuous in nature.

When the advancing poise has reached the far end of the scale beam and all of the raw material initially placed on the feeding mechanism has been delivered to the reaction chamber, it is, of course, necessary to reload the feeding mechanism and reset the scale by moving the poise back along the scale beam to a new position of balance. To the present time, it has been general practice to reload the feeding mechanism and reset the poise by hand. These operations, of course, consume a certain amount of time during which no raw material is delivered by the mechanism. No means has yet been provided to compensate in the feeding operation for this interval. This situation can be avoided by providing two sets of feeding mechanisms, each with its own balance system, the one set being operated while the second set is being reloaded. However, the relatively high cost of installing such additional equipment has generally prevented the adoption of such a procedure. Instead, it has been general practice to reduce to a minimum the time required for reloading the feeding mechanism and rebalancing the scale mechanism, so that the time required to accomplish these operations will be but a small percentage of the time required to deliver a single charge of raw material to the reaction chamber or other receiving means.

Such a procedure is satisfactory, when the rate at which the raw material is fed to the reaction chamber is relatively small compared to the time required to deliver an entire load of raw material from the conveyor belt or feeding mechanism to the reaction chamber. However, for certain types of raw material such as sheets of cellulose used in the manufacture of alkali cellulose, it is economically undesirable either to feed the raw material at such a low rate or to construct a feeding mechanism sufficiently large as to make insignificant in an entire feeding cycle the time required for the reloading and rebalancing operation. Nevertheless, at the same time, it is essential to the preparation of a desirable and uniform alkali cellulose, that the error caused by these operations either be eliminated or be reduced to an absolute minimum. When this alkali cellulose is to be converted into viscose for the manufacture of films or filaments of regenerated cellulose, the cellulose content of the alkali cellulose (and consequently the rate at which the cellulose is delivered to the reaction chamber) must be controlled to ± 0.5%. Such accuracy cannot be economically achieved by those prior art methods involving the reloading and subsequent hand rebalancing of the feeding means.

It is, therefore, an object of this invention to provide means for feeding at a constant rate and over extended periods of time involving several reloading and rebalancing operations, uniform amounts of a raw material to a reaction chamber or other receiving means.

It is a further object of this invention to adapt the "loss of weight" principle to a continuous operation, whereby that portion of the operation involving the reloading and rebalancing of the feeding mechanism, will not adversely affect the continuous nature of the operation, so that it will be possible to produce a uniform product over extended periods involving a plurality of reloading and rebalancing operations.

These and other objects will more clearly appear hereinafter.

The objects of this invention are accomplished in general by providing in a feeding mechanism mounted on a scale platform and adapted to operate on the "loss of weight" principle, means whereby at the end of a feeding cycle feeding action of the mechanism is halted for a predetermined period of time sufficient for the necessary reloading and rebalancing operations, and whereby provision is made for subsequently delivering from the feeding mechanism a sufficient amount of raw material to compensate for that amount which normally would have been delivered during a period equal to this predetermined inactive period of time.

More particularly, the objects of this invention are accomplished by providing a feeding mechanism adapted to operate on the "loss of weight" principle, and associated therewith apparatus and suitable electrical controlling circuits whereby an operator by pressing a single button can bring about the following succession of automatic operations: (1) stop the further advance of the poise member of the scale mechanism; (2) set in operation a timing device that will stop the further action of the feeding mechanism for a predetermined period of time sufficient for the reloading of the feeding mechanism and for the return of the poise member to a new position of balance; (3) simultaneously remove from the scale platform on which the feeding mechanism is mounted, a compensating weight, equal to that weight of raw material that would normally be delivered by the feeding mechanism during a period equal to this predetermined period of time; (4) automatically return the poise member to a new position of balance; (5) automatically return the compensating weight to the scale platform; and (6) so set the poise member in operation (advance at a constant rate toward the fulcrum of the scale beam) that a normal operation of the feeding mechanism again takes place. This operation includes the feeding of not only that amount of material called for by the advance of the poise, but also of that amount of material equivalent to the compensating weight.

Although the apparatus and principles of this invention are applicable for use in connection with the continuous feeding of almost any type of raw material wherein a constant and uniform rate of flow of that material is required over extended periods of time, the invention is particularly useful for and will be described in connection with the feeding of cellulosic materials such as sheets of wood pulp or cotton linters to a receiving means for the preparation of alkali cellulose of uniform composition.

The preferred embodiment of this invention will now be described with reference to the accompanying drawings wherein.

Figure 1:
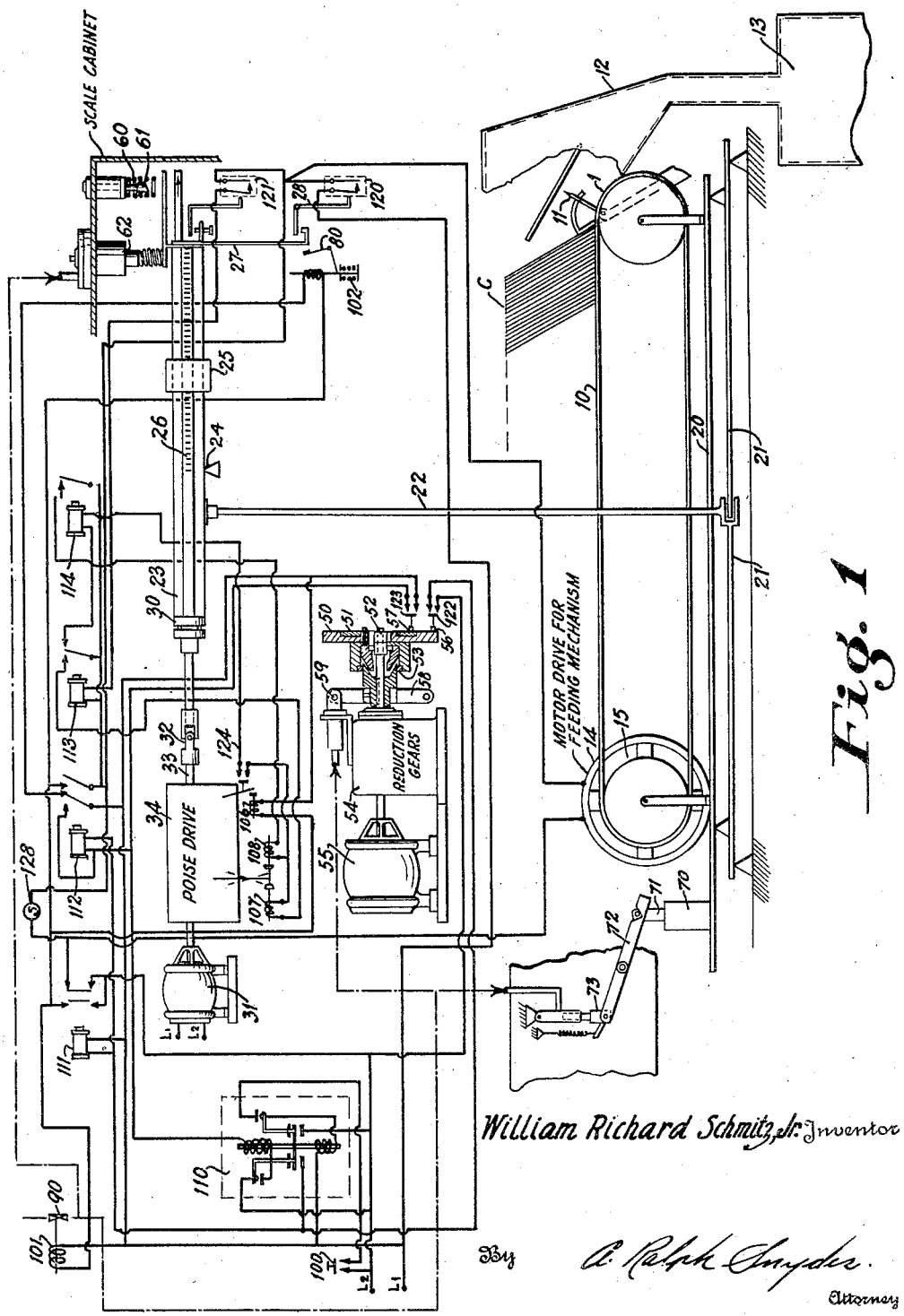
Fig. 1 is a diagrammatic view showing the organization of the various elements of the mechanism and the electrical controls therefor.

Referring particularly to Fig. 1, the apparatus of this invention comprises a suitable feeding mechanism mounted on a scale, which mechanism is preferably of the type disclosed in U. S. Patent No. 2,253,140 to Schmitz and comprises a belt conveyor means 10 adapted to convey a stack C of cellulose sheets, and a vertically reciprocating blade member 11 adapted to separate individual sheets of cellulose from the stack and deliver them to chute 12 of receiving means 13. The conveyor belt and reciprocating blade member are activated by motor 14 operating through suitable gearing (not shown) on a shaft extending through a conveyor belt drive roller 15, the operation of the motor being controlled by the balanced or unbalanced condition of the scale. This scale comprises a base plate or platform 20 supported on pivoted arms 21 operatively connected by tie rod 22 to the scale beam 23 pivoted on fulcrum 24. The scale beam, provided along its length with a movable poise 25 is also provided at its far end with a contact member 27 which cooperates with a pivoted lever means 28, to actuate mercury switch 120 in direct response to the successive balanced and unbalanced condition of the scale. The closing and opening of this switch starts and stops the motor 14 of the feeding mechanism.

Figure 2:
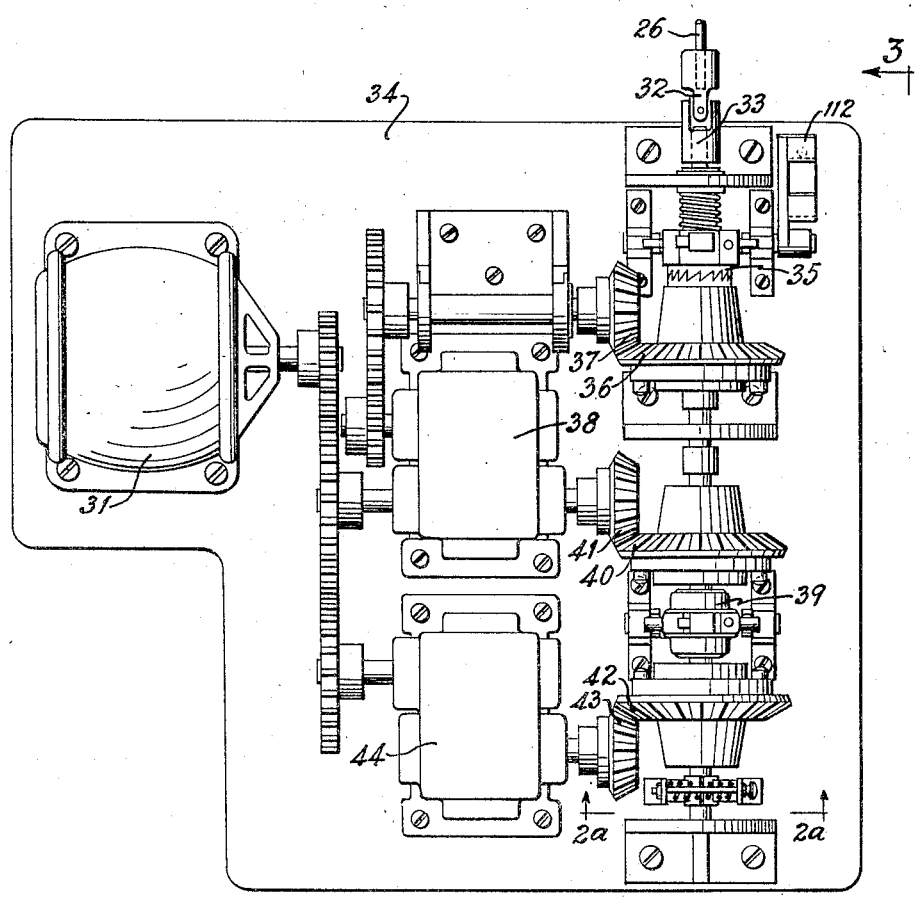
Fig. 2 is a plan view of a suitable poise drive assembly.
Figure 2A:
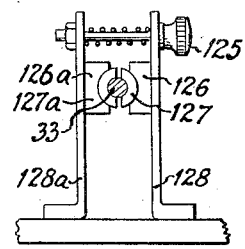
Fig. 2a is an end view of the friction brake on line 2a—2a of Fig. 2.
Figure 3:
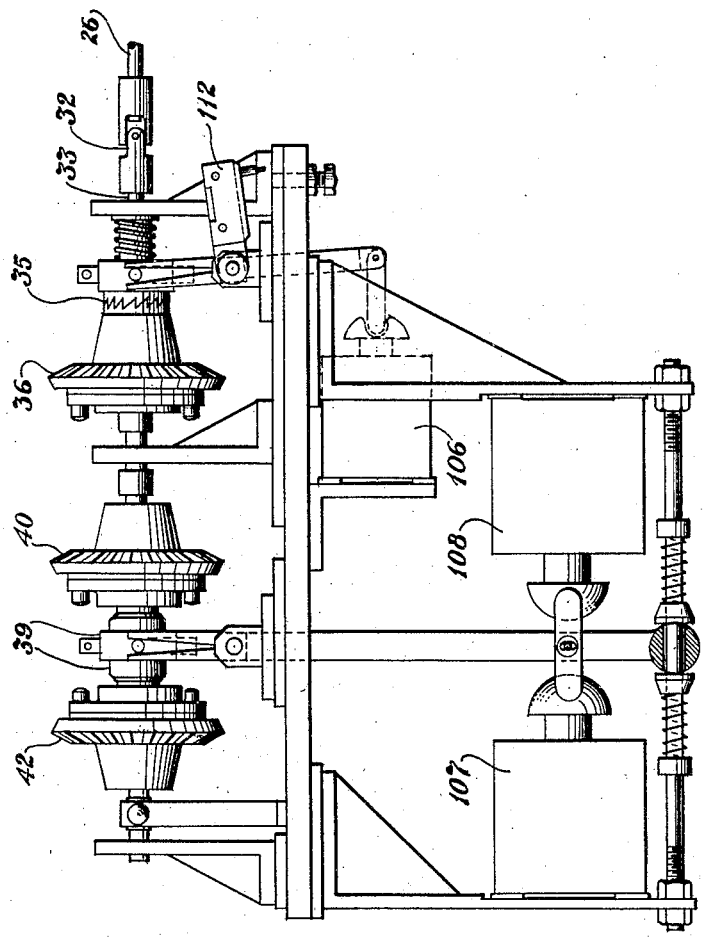
Fig. 3 is a side view on the line 3—3 of Fig. 2 showing the clutch operating means of the poise drive assembly.

Poise member 25 is mounted on, and operatively connected for movement along a rotatable threaded member 26. This member is supported on the scale beam by a main bearing 30 and is coupled to a continuously running constant speed motor 31 through a flexible coupling 32, shaft 33, and a suitable clutch and transmission assembly 34. Referring now to Figs. 2 and 3, the clutch and gear assembly comprises essentially a normally engaged jaw clutch 35 to connect the shaft 33 to the motor through bevel gears 36—37 and reducer 38; and a normally disengaged multiple disk clutch 39 to connect the shaft 33 to the motor through bevel gears 40—41 and reducer 38, or through bevel gears 42—43 and reducer 44. When the connection is through jaw clutch 35, gears 36—37 and reducer 38, the poise is advanced along the beam and toward the fulcrum 24 at a slow and uniform rate. When the connection is through clutch disk 39, gears 40—41, or gears 42—43 and reducer 44, the poise is moved in a reverse direction, the poise being moved at high speed through gears 40—41 and reducer 38 and at low speed through gears 42—43 and reducer 44. In a manner to be described hereinafter, the jaw clutch is disengaged by the action of solenoid 106, and the disk clutch is engaged by the action of solenoids 107 and 108 operatively connected to the clutches through a suitable arrangement of levers. At one end of shaft 33 in the poise drive assembly there is provided an adjustable friction brake comprising essentially shoes 127 and 127a supported on blocks 126, 126a respectively which in turn are carried on parallel uprights 128 and 128a connected by a pressure adjusting screw 125, (Fig. 2a). This produces a small braking force which opposes the turning of shaft 33 at all times. When the poise reaches the balance point, at the completion of the resetting cycle, this brake operates to stop the poise screw instantly, as disc clutch 39 is shifted to neutral position by the springs shown below solenoids 107 and 108 in Fig. 3. This follows the de-energizing of solenoid 108 by the opening of mercury switch 120, as hereinafter explained.

At the far end of scale beam 23 suitable means 60, 61 and 62 Fig. 1, are provided to restrict the displacement of the free end of the beam during the loading of pulp sheets onto conveyor 10 and to control the rate of travel of the beam from the displaced to the in-balance position during the resetting of the poise.

Stabilizer means 62 comprises a stabilizer spring 63 fitted in the outer end of a hollow piston 64, which in turn is mounted for reciprocal movement in cylinder 65 fixed to the scale cabinet. Compressed air fed to cylinder 65 from 3-way solenoid-actuated air valve 90, in the manner hereinafter described, drives piston 64 and hence spring 63 into operative position while the compression spring 66 fitted around piston 64 and within cylinder 65 tends to urge the piston to its inoperative position.

Springs 60 and 63 are so designed as to cause the beam to descend at a uniform rate during the period when the poise travels to the right at high speed. At the moment the scale beam extension 29 leaves spring 60, the rate of travel of the poise is reduced to low speed, which continues until the beam descends to the balance point. The spring on stabilizer 62 causes the scale beam to descend at the same rate as when the poise was returning at high speed. Stop screw 64a permits adjusting the travel of piston 64 so that when the scale beam reaches the balance point, spring 63 touches but exerts no downward force on the scale beam. The proper design and adjustment of these two springs cause the scale beam to descend very smoothly during the resetting of the poise, unaffected by the sudden change in rate of its travel as it approaches the balance point. As a result, the beam stops accurately at and does not over-ride the balance point. Spring 63 is raised beyond the operating or floating range of beam extension 29 at the end of the rebalancing cycle when solenoid 101 is de-energized.

In accordance with this invention, the apparatus also includes a timer mechanism and a removable weight 70. The timer mechanism provides a definite predetermined period of time for the reloading of the feeding mechanism and rebalancing of the scale, while the removable weight makes it possible to compensate for the weight of cellulose that would normally be delivered by the feeding mechanism during the predetermined period of time provided by the timer mechanism.

Figure 4:
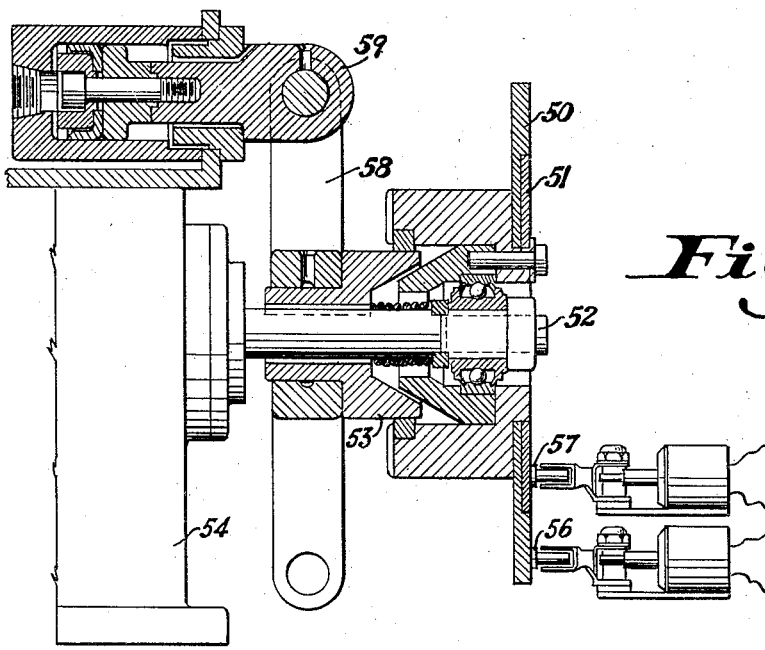
Fig. 4 is a side view, partly in section showing details of the timing device.
Figure 5:
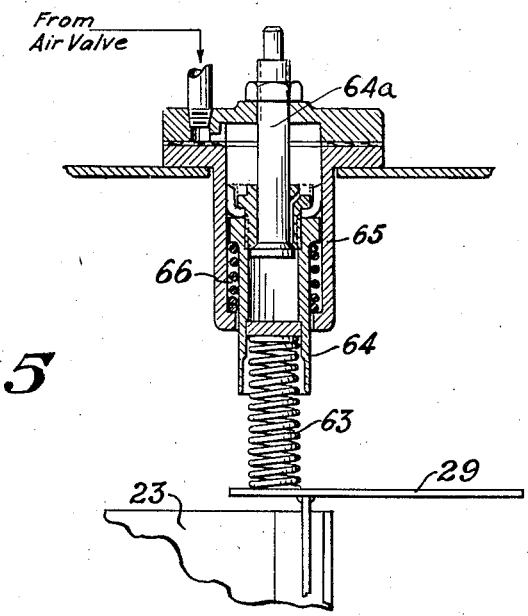
Fig. 5 is a side sectional view of the scale beam stabilizer.

As shown in Fig. 4, the timer mechanism comprises a pair of concentric disk members 50 and 51 of different diameter and mounted for rotation in side by side arrangement on shaft 52. This shaft which completes but one complete revolution during each reloading cycle, is connected through clutch means 53 and suitable reduction gearing 54 to a continuously operating constant speed motor 55. The gearing 54 is so arranged that the shaft (and disks 50, 51) will require, say, 75 seconds (a period sufficient for the reloading of the feeding mechanism and rebalancing of the scale) for a single revolution. As shown in the figure, the faces of the disks are provided with lugs 56, 57 of such proportions that during rotation of the disk member, they contact and open or close switches 122 or 123 respectively to make or break certain electrical circuits to be described later. Lugs 56 and 57 are so located, one with respect to the other and to the switches, that, as the disks rotate together, lug 56 first breaks contact with switch 122 and allows it to close, and some time later lug 57 contacts switch 123 and closes it momentarily. Clutch means 53 operatively connecting disks 50 and 51 with motor 55 is engaged by movement of connected levers 58 and 59 operated by compressed air fed from 3-way solenoid-actuated air valve 90, in the manner hereinafter described.

The removable weight 70 carefully adjusted to equal the weight of cellulose that would normally be delivered by the feeding mechanism during a period equivalent to that provided by the timer mechanism, is mounted on the scale platform alongside the feeding mechanism. The weight is lifted from the scale platform by operatively connected levers 71, 72, and 73 actuated by compressed air fed from 3-way air valve 90 in response to the energizing of solenoid 101.

A scale beam locking lever 80 actuated by solenoid 102 is provided to lock scale beam 23 in fixed position during the first portion of the reloading cycle.

It is obvious from the above discussion that the practice of this invention requires the proper correlation of several operations, this correlation being preferably achieved by electrical means involving a circuit including the action of several switches, magnetic relays, solenoids, etc. The preferred form of circuit is shown diagrammatically in Fig. 1 wherein the various elements are in the condition obtaining during the normal operation of the feeding mechanism.

Referring to Fig. 1, $L_1$ and $L_2$ denote the two leads of the main power line. The circuit comprises essentially a push button switch 100 to be closed by the operator at the start of the reloading-rebalancing operation; a solenoid 101 to operate 3-way air valve 90; solenoid 102 to operate scale beam locking lever 80; solenoid 106 to disengage jaw clutch 35; solenoids 107 and 108 to engage disk clutch 39 to connect the high and low speed reverse poise drives respectively; a commercial mechanical electrical reset relay 110 of the type manufactured by Struthers Dunn Inc. (Type "ABUY5N") adapted to temporarily hold closed the circuit initially closed by push button 100; relay switches 111, 112, 113, and 114; mercury switch 121, the opening of which causes the poise to change from high to low speed reverse during the re-balancing cycle; mercury switch 120 actuated in response to the balanced and unbalanced condition of the scale beam and effecting intermittent operation of scale conveyor motor 14; normally open spring controlled switch 123 temporarily held closed by lug 57 of timer disk 51; normally closed spring controlled switch 122 temporarily held open by lug 56 on the face of timer disk 50; and normally open switch 124.

While the feeding mechanism is in normal operation, jaw clutch 35 is in engagement and the poise is driven at a slow constant rate toward the fulcrum 24. At the same time switches 100, 110, 111, 112, 113, 114, 122, (held open by lug 56) 123 and 124 are "open." The flow of current is then from $L_2$ through the normally closed contacts of relay switch 111, to one connection of the conveyor drive motor 14, and from $L_1$ through mercury switch 120 to the other connection of motor 14. As previously pointed out, this mercury switch is actuated by the balanced and unbalanced condition of the scale through contact 27 and lever means 28. When the scale is in a condition of balance, this switch is open and no current flows through the circuit. The motor 14 is stopped. However, as scale beam 23 rises in response to the continued movement of the poise 25 toward fulcrum 24, contact 27 and lever means 28 move to close the switch, thus completing the circuit to motor 14 and setting feeding mechanism 1 and conveyor 10 in operation. As shown in the figure, the closing of switch 120 also completes the electrical circuit to warning lamp 128. The lighting of this lamp thus indicates that the motor 14 is running, and the moment light 128 goes out the scale is again in a condition of balance. By observing this light the operator is enabled to initiate the reloading cycle while the scale is in balance, i. e., just as light 128 goes out.

When the supply of sheets on the conveyor belt of the feeding mechanism is substantially depleted and it is necessary to reload the apparatus, the operator waits until the scale is in a condition of balance, as shown by the lighting of lamp 128, and then presses the push button switch 100; closing of this switch energizes the coil of latch-in-relay switch 110 and permits current to flow to relay switch 111. Energizing switch 111 serves to break the L₂ supply to conveyor drive motor 14, and connects the L₂ supply to solenoids 101, 102, and 106, thus completing the circuit to these solenoids. Energizing solenoid 101 opens 3-way air valve 90 which in turn simultaneously causes (1) beam stabilizer 62 to be lowered into operative position, (2) weight 70 to be lifted from the scale platform, and (3) engagement of clutch 53 whereby continuously running motor 55 operates the timer mechanism. Energizing solenoid 102 causes locking lever 80 to move into position under, and lock scale beam 23; energizing solenoid 106 disengages jaw clutch 35 and hence prevents further travel of the poise toward the fulcrum, and at the same time closes switch 124.

Operation of the timer mechanism causes the disks 50, 51 to rotate whereby projection 56 of disk 50 is moved out of contact with switch 122, thus permitting the switch to close and form a holding circuit in the L₂ line which circuit duplicates the one formed by the closing of switch 100. Switch 122 remains closed until disk 50 has completed one complete revolution, i. e. until the end of the reloading-rebalancing cycle. Upon completion of the first portion of the period provided by the timer mechanism (during which time the operator has completed the reloading of the feeding mechanism), disc 51 of the timer mechanism has rotated sufficiently far for its projection 57 to contact and close the normally-open spring-operated switch 123. The closing of this switch energizes the coil of relay switch 112, whereby the L₁ line to solenoid 102 is broken and scale beam 23 is unlocked and the L₂ supply is extended to the coils of relay switches 113 and subsequently 114. In the meantime the reloading of the feeding mechanism has given rise to a large unbalanced condition of the scale and since the scale beam is no longer locked, the far end of scale beam 23 is raised and mercury switches 120 and 121 are closed in the order named. The closing of these switches completes an L₁ supply to the coils of relay switches 113 and 114 closing switch 113 only. The closing of switch 113 breaks the L₂ supply to switch 114 and energizes solenoid 107 whereby disc clutch 39 is moved to the right (Fig. 3) and threaded member 26 of the scale beam is operatively connected with motor 31 through gearing 40, 41, and reducer 38, and the poise 25 is moved at high speed away from the fulcrum 24 toward a position of balance.

When the poise has moved sufficiently far away from fulcrum 24 so that the beam is only slightly out of balance (corresponding, for example, to an overweight amount of about 30 pounds on the feeding mechanism), the outer end of the beam is lowered to such an extent that mercury switch 121 is opened. The opening of this switch de-energizes relay 113 whereby solenoid 107 is de-energized and the high speed reverse of the poise member is stopped. The de-energizing of relay 113 simultaneously completes the L₂ line to the coil of relay switch 114. Closing of relay switch 114 energizes solenoid 108 whereby the disc clutch 39 is moved to the left (Fig. 3) and the threaded member of the scale beam is operatively connected with motor 31 through gearing 42, 43 and reducer 44. This causes the poise 25 to move away from the fulcrum and to an exact position of balance at a much slower speed. When this position is reached, mercury switch 120 is in turn opened, thus breaking the L₁ supply to relay switch 114 whereby disc clutch 39 is returned to a neutral position, the gears disengaged and further movement of the poise away from the fulcrum of the scale prevented.

With the feeding mechanism now loaded and the scale in a condition of balance, the entire apparatus remains stationary (save for the continued operation of timer mechanism) until the end of the predetermined period provided by that mechanism. It is, of course, necessary that the reloading and rebalancing operations take place sufficiently rapidly so that they will be completed before the end of this period.

At the end of this period lug 56 of the disc 50 of the timer mechanism again contacts and opens switch 122, thus breaking the L₂ holding circuit for relay switch 111 and causing this switch to "open."

The opening of switch 111 breaks the L₂ supply to, and thus de-energizes solenoids 101 and 106. The de-energizing of solenoid 101 closes the three-way air valve 90 to simultaneously (1) disengage clutch 53 of the timer mechanism from contact with motor 55 and prevent further rotation of the discs 50, 51; (2) move the stabilizing means 62 out of contact with the scale beam so that the beam is free to move in direct response to the balanced or unbalanced condition of the scale; (3) replace the compensating weight 70 in position on the scale.

The de-energizing of solenoid 106 causes the jaw clutch 35 to engage and drive the threaded member 26 in the forward direction so as to move the poise 25 at a uniform speed toward the fulcrum 24 of the scale. At the same time, switch 124 (closed by the energizing of solenoid 108) is returned to its normally open position. The opening of this switch, it will be seen, prevents the accidental energizing of solenoids 107 and 108, controlling the action of disc clutch 39. The switch 124 thus serves as an electrical interlock to prevent the engagement of this clutch with gears 40, 41 or 42, 43 when jaw clutch 35 is in engagement.

The opening of relay switch 111 also completes the L₂ circuit to motor 14 of the feeding mechanism so that this motor is once more operatively controlled by the closing and opening of mercury switch 120 in direct response to successive unbalanced and balanced conditions of the scale during normal operation. This normal operation then continues until such time as the feeding mechanism again requires reloading, at which time the entire sequence of operations provided by this invention is repeated.

Although the apparatus has been described above in terms of specific mechanical and electrical elements, it is obvious that many modifications and changes can be made in the various parts without departing from the principles of the invention. For example, instead of employing the single motor and multiple clutch arrangement of Figs. 2 and 3 for the advancing and resetting of the poise along the scale beam, a single clutch means can be used to operatively connect the threaded member of the poise-advancing means to either of two motors (one for advancing and the other for resetting) depending on the direction in which it is desired to move the poise. If, in such a case, the reset motor is a variable speed motor, adequate control of the resetting of the poise can be obtained by placing resistances in the motor circuit, as the poise approaches a position of balance, whereby the final position of the poise can be accurately controlled. Or, the poise driving mechanism could comprise two separate motors, mounted at opposite ends of the poise driving shaft, one motor serving to drive the poise in one direction and the other serving to drive it in the reverse direction; the action of the motors would preferably be controlled in a manner similar to that employed in the preferred embodiment, above, for controlling the action of the clutches 35 and 39. Modifications of the scale construction, timer device, feeding mechanism, and the other structural feature herein disclosed, obvious to the skilled mechanic, are likewise contemplated.

Various modifications can also be made in the electrical circuit employed for operating the various pieces of apparatus, provided only that the proper sequence of operating steps is observed, including the provision of a definite period of time for accomplishing the reloading and rebalancing operations, and the provision of a means for subsequently feeding in a weight of raw material equal to that which would normally be fed by the apparatus during a period equal to this predetermined period of time.

In certain instances, and to prevent an error on the operator's part, it may be desired to incorporate into the apparatus of the invention a system of warning lights or bells to indicate the exact status of the operation at hand and to warn the operator that the supply of raw material on the feeding mechanism is becoming low, etc. Such a warning system is, of course, contemplated by the invention.

The practice of this invention makes possible the use of the loss of weight principle in a continuously operating process wherein great accuracy in the feeding of raw materials to a receiving means must be had, because the invention substantially eliminates any error in the feeding of raw material brought about by the time consumed in reloading the feeding mechanism and resetting the poise of the weighing device. By way of example, the use of the timing device and the automatic reset mechanism of this invention has reduced the error in total weight of cellulose fed by known types of feeding devices from approximately 5% to less than 0.1%.

A further advantage resides in the fact that this invention does away with the necessity of providing two sets of feeding mechanisms, or of providing a feeding mechanism of relatively large, and hence plant spaceconsuming size, in order to achieve the high degree of accuracy in the rate of reactant delivery required in many chemical manufacturing processes.

Also, because this invention makes the resetting of the poise entirely automatic, any error on the part of the operating personnel is avoided. The importance of such an advantage will be readily appreciated.

I claim:

1. In a controlled material feeding apparatus comprising a beam scale, a poise arranged to move at a predetermined rate on the beam toward the fulcrum thereof to continuously urge the beam into unbalanced condition and a material carrier mounted on the platform of said scale and provided with means to discharge said material from the carrier, said means being operative to discharge material from the carrier in response to the unbalanced condition of the beam whereby to urge the beam into balanced condition, the improvement which comprises means for simultaneously stopping the movement of the poise and of the discharge means for a predetermined period of time sufficient to permit loading of the carrier, means for automatically resetting the poise to a point of balance corresponding to the load on the carrier, and means including an additional compensating weight added to the carrier immediately after the carrier is loaded operatively immediately after said predetermined period of time for discharging from said carrier an added amount of material to compensate for that amount which normally would have been discharged during a period equal to said predetermined period of time, said compensating weight being equal in weight to the additional amount of material to be discharged.

2. Controlled material feeding apparatus comprising, in combination, a scale having a load holding platform, a scale beam operatively associated therewith, a movable poise on said beam and means for continuously advancing said poise at a predetermined rate toward the fulcrum of the beam whereby to unbalance said beam; carrier means mounted on said platform and adapted to support a predetermined load of material coupled with discharge means for discharging increments of said load, means for operating said discharge means responsive to the unbalanced condition of the beam whereby to bring the beam into balanced condition, means for stopping the continuous movement of the poise toward the fulcrum of the beam and for simultaneously stopping the operation of the discharge means for a predetermined period of time sufficient to reload the carrier means, means associated with said stopping means and operative during said period for returning the poise to a point of balance corresponding to the load on the scale, means for again setting the poise-moving and material-discharging means in operation and means including an additional compensating weight added to the platform immediately after the carrier means is loaded for discharging an added amount of material to compensate for that amount which normally would have been discharged during a period equal to said predetermined period of time, said compensating weight being equal in weight to the additional amount of material to be discharged.

3. Controlled material feeding apparatus comprising in combination a scale having a load holding platform, a scale beam operatively associated therewith, a movable poise on said beam and means for continuously moving said poise at a predetermined rate toward the fulcrum of said beam whereby to continuously urge said beam into a condition of unbalance, an advancing material conveyor provided with material discharge means mounted on said platform, said conveyor and discharge means being operative in response to the unbalanced condition of the beam whereby to urge said beam into a condition of balance, means for simultaneously stopping the advance of the poise and the operation of the conveyor for a predetermined period of time sufficient for reloading said conveyor, means operative during said period for resetting the poise to balance the loaded conveyor, and means including an additional compensating weight added to the platform immediately after the conveyor is loaded operative immediately after said period to cause said discharge means to discharge an additional amount of material to compensate for that amount which normally would have been discharged during a period equal to said predetermined period of time, said compensating weight being equal in weight to the additional amount of material to be discharged.

4. Controlled material feeding apparatus comprising in combination a scale having a load holding platform, a scale beam operatively associated therewith, a movable poise on said beam and means for continuously moving said poise at a predetermined rate toward the fulcrum of said beam whereby to continuously urge said beam into a condition of unbalance, an advancing material conveyor provided with material discharge means mounted on said platform, said conveyor and discharge means being operative in response to the unbalanced condition of the beam whereby to urge said beam into a condition of balance, means for simultaneously stopping the advance of the poise and the operation of the conveyor for a predetermined period of time sufficient for reloading said conveyor, means operative during said period for resetting the poise to balance the loaded conveyor means to stabilize the motion of the beam during the resetting operation, and means operative immediately after said resetting operation to place on said platform a weight of such magnitude that the discharge means will operate to discharge an additional amount of material to compensate for that amount which normally would have been discharged during a period equal to said predetermined period of time.

5. Apparatus according to claim 4 wherein the advancing material conveyor is an endless belt conveyor.

6. Controlled material feeding apparatus comprising in combination a scale having a load holding platform, a scale beam operatively associated therewith, a poise on said beam and electrically operated means for continuously advancing said poise toward the fulcrum of the beam at a predetermined rate whereby to continuously urge said beam into a condition of unbalance, an endless belt material conveyor and associated material discharge means, electrical means for operating said endless belt and discharge means responsive to the unbalanced condition of said beam, whereby said discharge means is caused to discharge sufficient material to bring said beam momentarily into a condition of balance, an electrically controlled timing mechanism arranged to simultaneously stop the continuous advance of the poise and operation of the conveyor for a predetermined period of time sufficient to permit loading of said conveyor, means operative during said period for resetting said poise during the latter portion of said period to balance the loaded conveyor, and to start the normal feeding operation of the apparatus at the end of said period, and means operative immediately after said resetting operation to place on said platform a weight of such magnitude that the discharge means will operate to discharge an additional amount of material to compensate for that amount which normally would have been discharged during a period equal to said predetermined period of time.

WILLIAM RICHARD SCHMITZ, Jr.